United States Patent
Jung et al.

(10) Patent No.: US 12,187,352 B2
(45) Date of Patent: Jan. 7, 2025

(54) CONSTRUCTION MACHINE

(71) Applicant: Wirtgen GmbH, Windhagen (DE)

(72) Inventors: Frank Jung, Königswinter (DE); Willi Preis, Bad Honnef (DE)

(73) Assignee: Wirtgen GmbH, Windhagen (DE)

( * ) Notice: Subject to any disclaimer, the term of this patent is extended or adjusted under 35 U.S.C. 154(b) by 352 days.

(21) Appl. No.: 17/959,380

(22) Filed: Oct. 4, 2022

(65) Prior Publication Data

US 2023/0123168 A1 Apr. 20, 2023

(30) Foreign Application Priority Data

Oct. 14, 2021 (DE) ...................... 10 2021 126 709.9

(51) Int. Cl.
  *B62D 33/06* (2006.01)
  *E01C 23/06* (2006.01)
  *E02F 9/16* (2006.01)

(52) U.S. Cl.
  CPC .............. *B62D 33/06* (2013.01); *E01C 23/06* (2013.01); *E02F 9/166* (2013.01); *E01C 2301/30* (2013.01)

(58) Field of Classification Search
  CPC ............................. B62D 25/06; B62D 33/0617; B62D 33/0625; B60J 7/16; E02F 9/166
  (Continued)

(56) References Cited

U.S. PATENT DOCUMENTS 2,831,689 A * 4/1958 Marsh .................. A63B 63/083
  248/188.5
3,161,395 A * 12/1964 Carter .................... A47B 27/02
  248/354.7

(Continued)

FOREIGN PATENT DOCUMENTS

DE  102017221053 A1  5/2019
EP  1637377 A2  8/2005

(Continued)

OTHER PUBLICATIONS

European Patent Office Search Report for corresponding patent application No. 221646EP, dated Mar. 13, 2023, 5 pages.

*Primary Examiner* — Dennis H Pedder
(74) *Attorney, Agent, or Firm* — Lucian Wayne Beavers; Patterson Intellectual Property Law, PC (57) ABSTRACT

In a construction machine (1) for working a ground pavement, comprising a machine frame (5) supported by travelling devices (3), an operator platform (11) arranged on the machine frame (5), and a protective canopy (13), adjustable in height by means of a telescopic guide unit (2), arranged on the operator platform (11), wherein the telescopic guide unit (2) comprises at least one first telescopic element (4) and one second telescopic element (6), wherein the first telescopic element (4) is at least partially guidable in the second telescopic element (6), at least one driving device (10) for moving the protective canopy (13) up and down by means of moving the first telescopic element (4) relative to the second telescopic element (6), it is provided that at least one recess (14) in the first telescopic element (4) and at least one latching element (12) are provided, wherein the latching element (12) is arranged to pivot about a pivoting axis (16) on the second telescopic element (6) and is shaped in such a fashion that, by means of moving the first telescopic element (4) relative to the second telescopic element (6) in a first direction (B), a first part (18) of the latching element (12) is pivotable into the recess (14) and a second part (20) of the latching element (12) presses against the outer side (22) of the first telescopic element (4) from outside.

20 Claims, 7 Drawing Sheets

(58) Field of Classification Search
USPC ........ 296/102, 180.08, 9, 187.13; 403/109.3, 403/109.5
See application file for complete search history.

(56) References Cited

U.S. PATENT DOCUMENTS

| | | | |
|---|---|---|---|
| 4,026,597 A * | 5/1977 | Miller ................. | B66F 9/07545 |
| | | | 296/107.03 |
| 4,644,617 A | 2/1987 | Tupper et al. | |
| 5,323,997 A | 6/1994 | Danaj | |
| 9,598,875 B1 * | 3/2017 | Bateman ................. | F21V 25/00 |
| 10,822,041 B2 | 11/2020 | Barimani et al. | |
| 2019/0161131 A1 | 5/2019 | Barimani et al. | |

FOREIGN PATENT DOCUMENTS

| | | |
|---|---|---|
| EP | 1637377 A3 | 7/2007 |
| EP | 2450213 B1 | 8/2013 |

\* cited by examiner

CONSTRUCTION MACHINE

BACKGROUND OF THE DISCLOSURE

1. Field of the Disclosure

The present invention relates to a construction machine having an adjustable height roof.

DESCRIPTION OF THE PRIOR ART

Construction machines are known that comprise a machine frame supported by travelling devices, an operator platform arranged on the machine frame, and a protective canopy, adjustable in height by means of a telescopic guide unit, arranged on the operator platform. The telescopic guide unit usually comprises at least one first telescopic element and one second telescopic element, wherein the first telescopic element is at least partially guidable in the second telescopic element. Furthermore, at least one drive unit is provided for moving the protective canopy up and down by means of moving the first telescopic element relative to the second telescopic element.

SUMMARY OF THE DISCLOSURE

With such adjustable protective canopies, there is frequently the problem that wobbling and rattling of the protective canopy may occur during movement of the construction machine. To avoid this, the present state of the art provides a telescopic guide unit of complex design comprising guide pieces.

It is therefore the object of the present invention to create a relatively simple design solution for adjusting the protective canopy, wherein wobbling and rattling of the protective canopy is reduced.

The present invention advantageously provides that at least one recess in the first telescopic element and at least one latching element are provided, wherein the latching element is arranged to pivot about a pivoting axis on the second telescopic element and is shaped in such a fashion that, by means of moving the first telescopic element relative to the second telescopic element in a first direction, a first part of the latching element is pivotable into the recess and a second part of the latching element presses against the outer side of the first telescopic element from outside.

The present invention has the advantage, on the one hand, that the latching element is arranged on the second telescopic element and can thus not be lost, and, on the other hand, that the latching element applies an external force to the outer side of the first telescopic element, thus reducing any potential wobbling and rattling of the telescopic guide unit.

In the latched-in position, the first part of the latching element may be in the recess and the second part of the latching element may press against the first telescopic element in such a fashion that the first telescopic element may be canted or locked in place, respectively, in the second telescopic element.

Canting the first telescopic element in the second telescopic element has the advantage of reducing the wobbling and rattling of the telescopic guide unit.

Once the latching element is in the latched-in position, further movement of the first telescopic element relative to the second telescopic element in a first direction is no longer possible, since the second part of the latching element is already pressing against the outer side of the first telescopic element and therefore further pivoting movement of the latching element is not possible. The first telescopic element is, as it were, in a stop position. If an additional force is applied to the first telescopic element in the first direction, this merely increases the force that the first telescopic element exerts on the first part of the latching element, and thus indirectly also increases the force with which the second part of the latching element presses against the outer side of the first telescopic element.

For the purpose of adjusting the first telescopic element relative to the second telescopic element, the latching element may be pivotable into an adjustment position in which, on the one hand, the first part of the latching element is pivoted out of the recess, and the second part of the latching element does not press against the outer side of the first telescopic element, so that the first telescopic element is guidable with play in the second telescopic element.

As a result of the first telescopic element being at least partially guidable with play in the second telescopic element, the first telescopic element may be relatively easily adjusted relative to the second telescopic element. Even if dirt or the like gets into the telescopic guide unit, adjustment of the first telescopic element relative to the second telescopic element may still be effected because of the play.

For the purpose of pivoting the latching element from the latched-in position into the adjustment position, the first part of the latching element, the pivoting axis and the second part of the latching element may be arranged relative to each other in such a fashion, and the first part of the latching element may exhibit such a contour that, by means of moving the first telescopic element relative to the second telescopic element in a second direction opposite to the first direction, the first part of the latching element pivots out of the recess and pivots into the adjustment position.

This has the advantage that the first telescopic element may be adjusted in a very simple manner relative to the second telescopic element in a second direction opposite to the first direction. The latching element moves into the adjustment position solely as a result of the adjustment in the second direction.

This is advantageous in comparison with the previous state of the art, in which a bolt is usually inserted, which had to be pulled out beforehand, regardless of whether the telescopic element is adjusted in the first direction or the second direction.

For the purpose of pivoting the latching element from the adjustment position into the latched-in position, the first telescopic element may be movable relative to the second telescopic element in the first direction, and the first part of the latching element, once the latching element is at the height of a recess, may pivot into the recess as a result of the self-weight and/or as a result of a spring force of a spring element.

An adjustment element, which is preferably a lever arm, may be connected to the latching element, by means of which the latching element is pivotable away from the first telescopic element into a retract position in which, even during movement of the first telescopic element in the first direction, the first part of the latching element does not pivot into the recess.

When the latching element is in the retract position, the telescopic guide unit, and thus the protective canopy, may be retractable without the latching element automatically pivoting into the recess.

The first direction in which the telescopic element is movable may be the same direction in which, essentially, the weight force acts, so that, in the latched-in position, the total weight force of the first telescopic element and the protective canopy connected to the same acts on the first part of the latching element and pivots the latching element in such a direction that the second part of the latching element presses on the outer side of the first telescopic element.

In the second telescopic element, at least one guide element may be provided, which guides the first telescopic element in the second telescopic element.

The play with which the first telescopic element is guidable in the second telescopic element may be adjusted by means of the at least one guide element.

The at least one guide element may be a sliding shoe and/or a guide roller.

The protective canopy may preferably be arranged at an offset relative to a longitudinal axis of the first telescopic element. This has the advantage that the telescopic guide unit may be arranged, for example, on the rear part of the operator platform and the protective canopy extends across the entire operator platform.

In the retracted position of the telescopic guide unit, the protective canopy is in the lowest position. The construction machine may be transported in this position. The protective canopy may be secured in this position by means of a lock. This enables the operator platform to be protected from vandalism, for example, or it may prevent wind from getting under the canopy during transport.

The first and also the second telescopic element may be square tubes.

The driving device may be a hydraulic driving device and/or a mechanical driving device, which is, for example, operated manually. This may be, for example, a cable winch.

BRIEF DESCRIPTION OF THE DRAWINGS

In the following, one embodiment of the present invention is explained in more detail with reference to the drawings.

The following is shown schematically:

FIG. 1 a construction machine with protective canopy,
FIG. 2 a telescopic guide unit with protective canopy,
FIG. 3 a detailed view according to FIG. 2,
FIG. 4 a latching element,
FIG. 5 the latching element according to FIG. 4 in the retract position,
FIG. 6 a telescopic guide unit in retracted position, and
FIG. 7 a different view of the telescopic guide unit according to FIG. 6.

DETAILED DESCRIPTION

Figure 1:
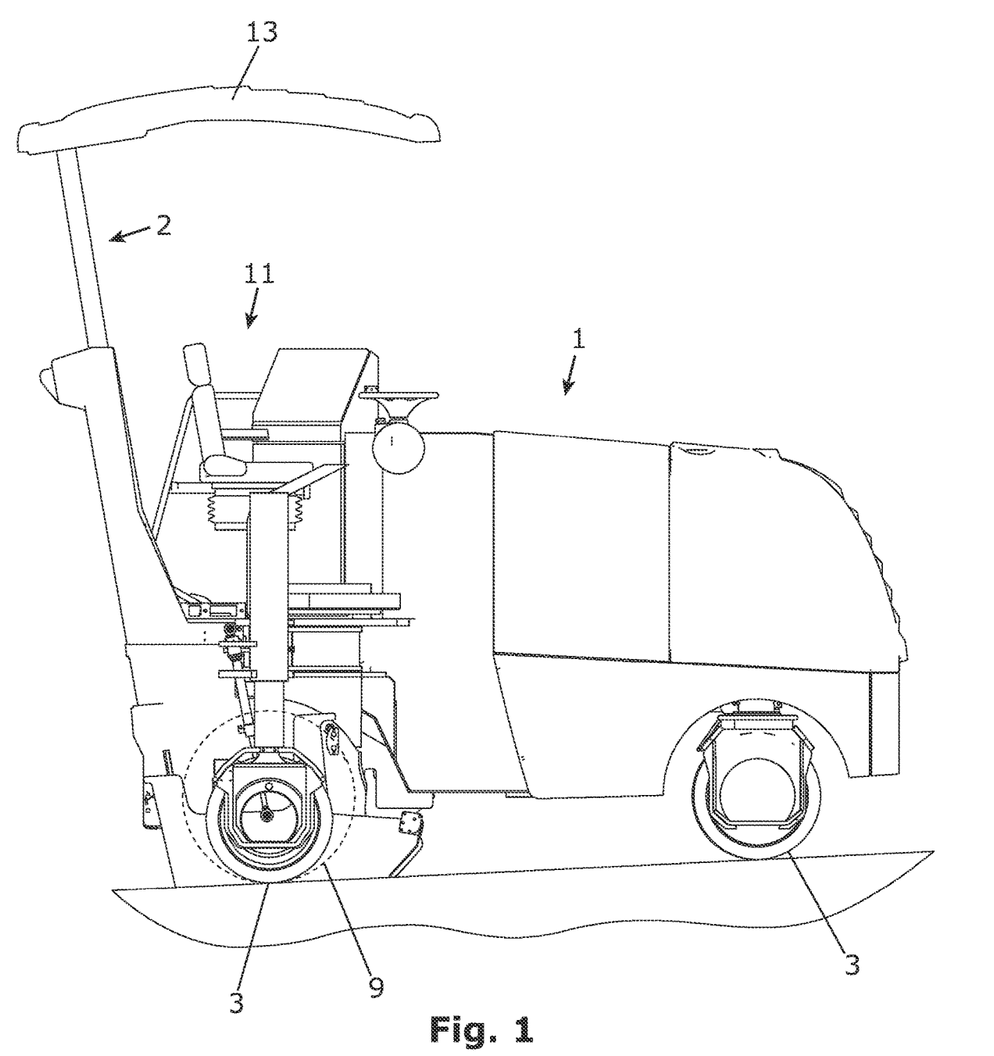

FIG. 1 shows a construction machine for working a ground pavement which may also be referred to as a ground surface. The construction machine comprises travelling devices 3. The travelling devices 3 may be wheels or tracked ground-engaging units. The tracked ground-engaging units may be referred to as tracks. The construction machine further comprises a machine frame 5. The machine frame 5 is preferably connected to the travelling devices 3 by means of lifting columns. The distance between the machine frame 5 and the ground pavement may thus be adjustable.

The travelling devices 3 may alternatively also be rigidly connected to the machine frame 5.

A working device 9 is preferably arranged on the machine frame 5, which can be used to work the ground pavement.

An operator platform 11 is arranged on the machine frame 5. A driver may stand or sit on the operator platform 11 and operate the construction machine.

A protective canopy 13 adjustable in height by means of a telescopic guide unit 2 may be arranged on the operator platform 11. The telescopic guide unit 2 may also be referred to as a telescopic guide 2.

Figure 2:
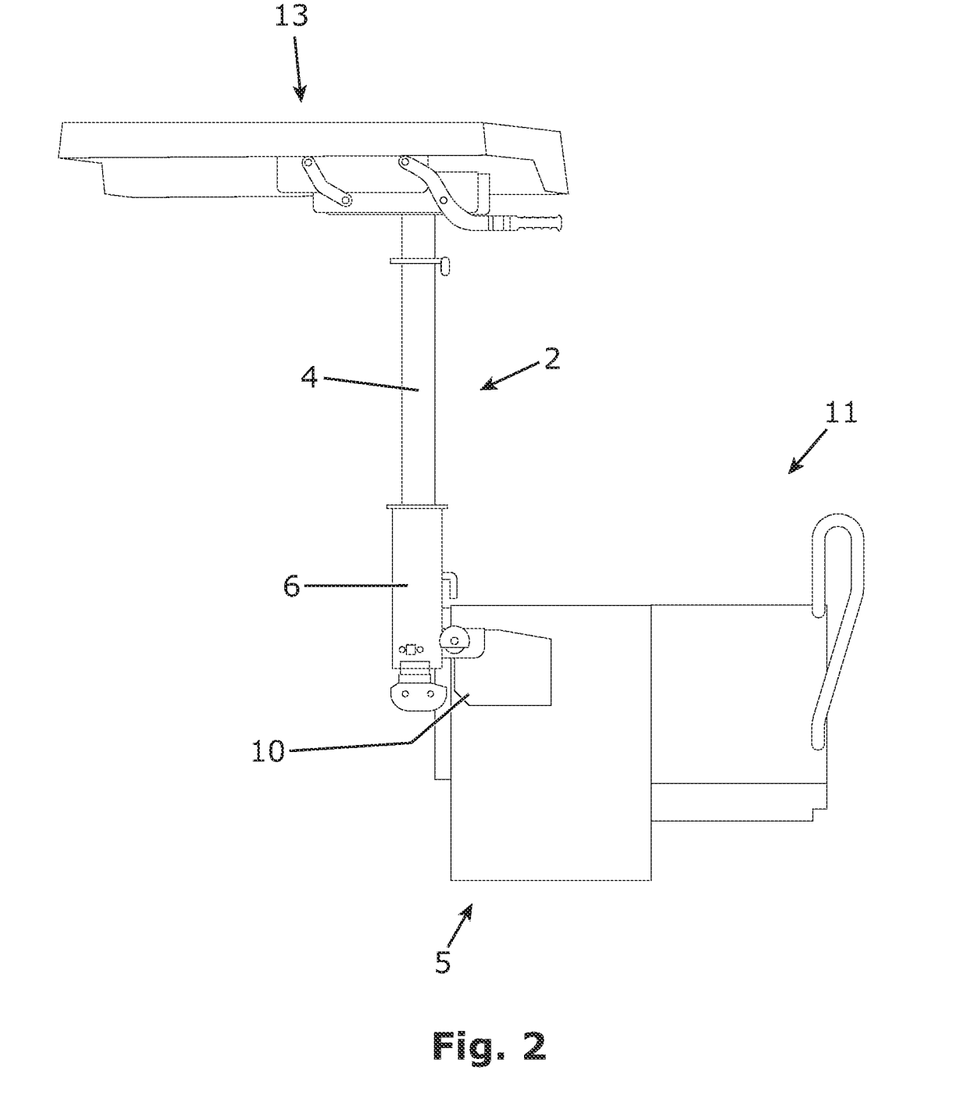

It can be inferred from FIG. 2 that the telescopic guide unit 2 comprises at least one first telescopic element 4 and one second telescopic element 6, wherein the first telescopic element 4 is at least partially guidable in the second telescopic element 6. The first and second telescopic elements 4 and 6 may be first and second telescopic tubes 4 and 6, which may be square tubes.

Furthermore, a driving device 10 is provided for moving the protective canopy 13 up and down. The driving device 10 may be referred to as a telescopic drive 10 or simply as a drive 10.

Figure 3:
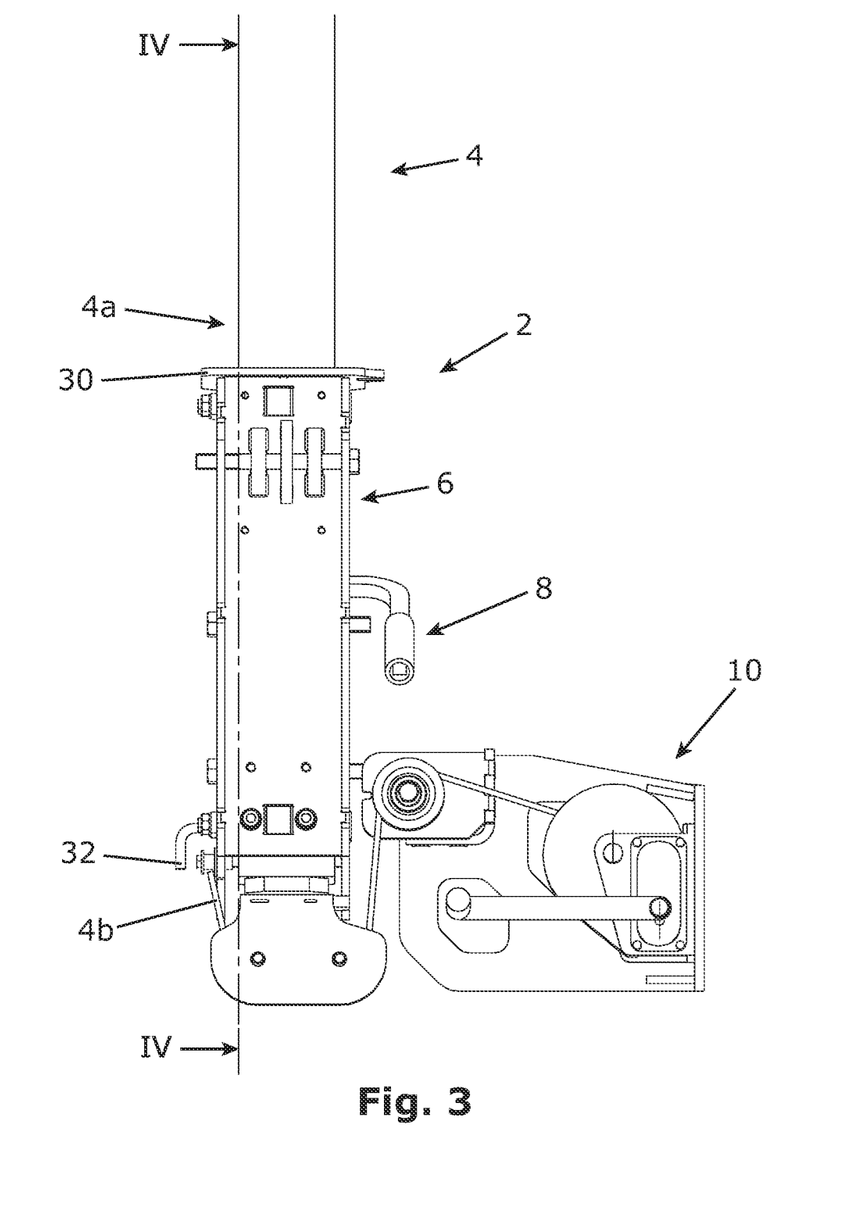

A detail from FIG. 2 is depicted in FIG. 3, in which the telescopic guide unit 2 and the driving device 10 are depicted in more detail. The telescopic guide unit 2 comprises the first telescopic element 4 and the second telescopic element 6, wherein the first telescopic element 4 is at least partially guidable in the second telescopic element 6. The second telescopic element 6 is preferably connected directly or indirectly to the machine frame 5.

When the first telescopic element 4 is guidable in the second telescopic element 6, and the first telescopic element 4 is adjusted relative to the second telescopic element 6, the part 4a, which projects relative to the second telescopic element 6 on the side 30 of the second telescopic element 6, is lengthened or shortened. As a result, the protective canopy may be adjusted in height relative to the second telescopic element 6 and thus relative to the machine frame 5.

Figure 4:
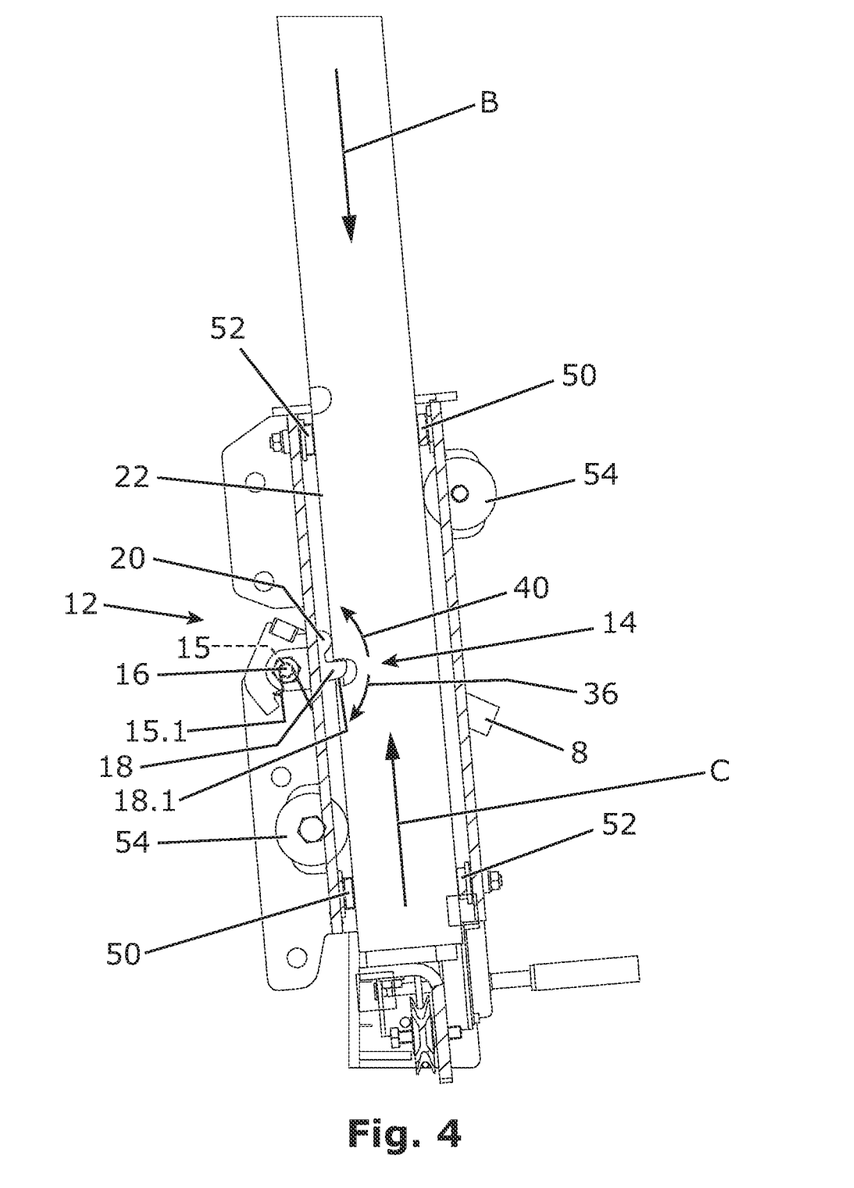

FIG. 4 shows a sectional view of FIG. 3 in the direction 4-4 depicted in FIG. 3.

A latching element 12 is depicted in FIG. 4. The latching element 12 may also be referred to as a latching lever 12. The latching element 12 is arranged to pivot about a pivoting axis 16 on the second telescopic element 6. The latching element 12 comprises a first part 18 and a second part 20. Furthermore, the first telescopic element 4 comprises at least one recess 14. The latching element 12 is shaped in such a fashion that, by means of moving the first telescopic element 4 relative to the second telescopic element 6 in a first direction B, the first part 18 of the latching element 12 is pivotable into the recess 14 and the second part 20 of the latching element 12 presses against the outer side 22 of the first telescopic element 4 from outside.

When the first telescopic element 4 is moved relative to the second telescopic element 6 in the direction B, and the recess 14 is at the height of the first part 18 of the latching element 12, the latching element 12 pivots in the direction 36 as a result of the weight force of the latching element 12 and/or as a result of a spring element 15 into the recess 14. As schematically shown in FIG. 4 the spring element 15 may be in the form of a coil spring wrapped around the bolt defining the pivoting axis 16, with a leg 15.1 of the spring element 15 engaging the latching element 18 to bias the latching element 18 in a clockwise direction about axis 16. The second part 20 of the latching element 12 then presses against the outer side 22. Once the latching element 12 is in the latched-in position, further movement of the first telescopic element 4 relative to the second telescopic element 6 in a first direction B is no longer possible, since the second part 20 of the latching element 12 is already pressing against the outer side 22 of the first telescopic element 4 and therefore further pivoting movement of the latching element 12 is not possible. The first telescopic element 4 is, as it were, in a stop position. If an additional force is applied to the first telescopic element 4 in the first direction B, this merely increases the force that the first telescopic element 4 exerts on the first part 18 of the latching element 12, and thus indirectly also increases the force with which the second part 20 of the latching element 12 presses against the outer side 22 of the first telescopic element 4.

The first direction B preferably essentially acts in the same direction in which the weight force acts, i.e. in the direction of gravity, so that, in the latched-in position, the total weight force of the first telescopic element 4 and the protective canopy 13 connected to the same acts on the first part 18 of the latching element 12 and the latching element 12 is pivoted in the direction 36, so that the second part 20 of the latching element 12 presses on the outer side 22 of the first telescopic element 4.

In the latched-in position, the first part 18 of the latching element 12 is in the recess 14, and the second part 20 of the latching element 12 is pressed against the first telescopic element 4 in such a fashion that the first telescopic element 4 jams or cants in the second telescopic element 6, or may be locked in place, respectively. This has the advantage that vibrations and rattling are significantly reduced, since the first telescopic element 4 is canted in this position in the second telescopic element 6.

FIGS. 3 and 4 further depict an adjustment element 8 realized as a lever element, the function of which is explained in more detail in the further figures. Adjustment element 8 may be referred to as an adjustment lever 8.

FIG. 4 depicts guide elements 50, 52, 54, which are arranged on the second telescopic element 6 and guide the first telescopic element 4 in the second telescopic element 6. The guide elements 50, 52 are sliding guides, and the guide elements 54 are guide rollers. The guide elements 52 are adjustable so that the play is adjustable with which the first telescopic element 4 is guidable in the second telescopic element 6.

FIG. 4 furthermore depicts a second direction C, which is opposite to the first direction B. When the first telescopic element 4 is adjusted relative to the second telescopic element 6 in the second direction C, the latching element 12 pivots in the direction of rotation 40, because the first part 18 of the latching element 12 is moved, together with the recess 14, in the second direction C. As a result, the latching element 12 pivots in the direction of rotation 40. The first part 18 of the latching element 12 may have a contour 18.1 configured such that, by means of moving the first telescopic element 4 relative to the second telescopic element 6 in the second direction C, the first part 18 of the latching element 12 pivots out of the recess. As a result, the first part 18 of the latching element 12 pivots out of the recess 14, and the second part 20 of the latching element 12 also pivots away from the outer side 22. The first telescopic element 4 may then be arbitrarily adjusted in the second direction C until the protective canopy 13 has reached the desired height. When the protective canopy 13 is at the desired height, the telescopic element 4 may be guided in the first direction B again. Once the first part 18 of the latching element 12 is then at the height of a recess 14, the first part 18 of the latching element 12 may pivot into a recess 14 again, and the second part 20 of the latching element 12 may press against the outer side 22 of the first telescopic element 4 again.

When the protective canopy 13 is to be fully retracted, however, the latching element 12 must be brought into a retract position.

Figure 5:
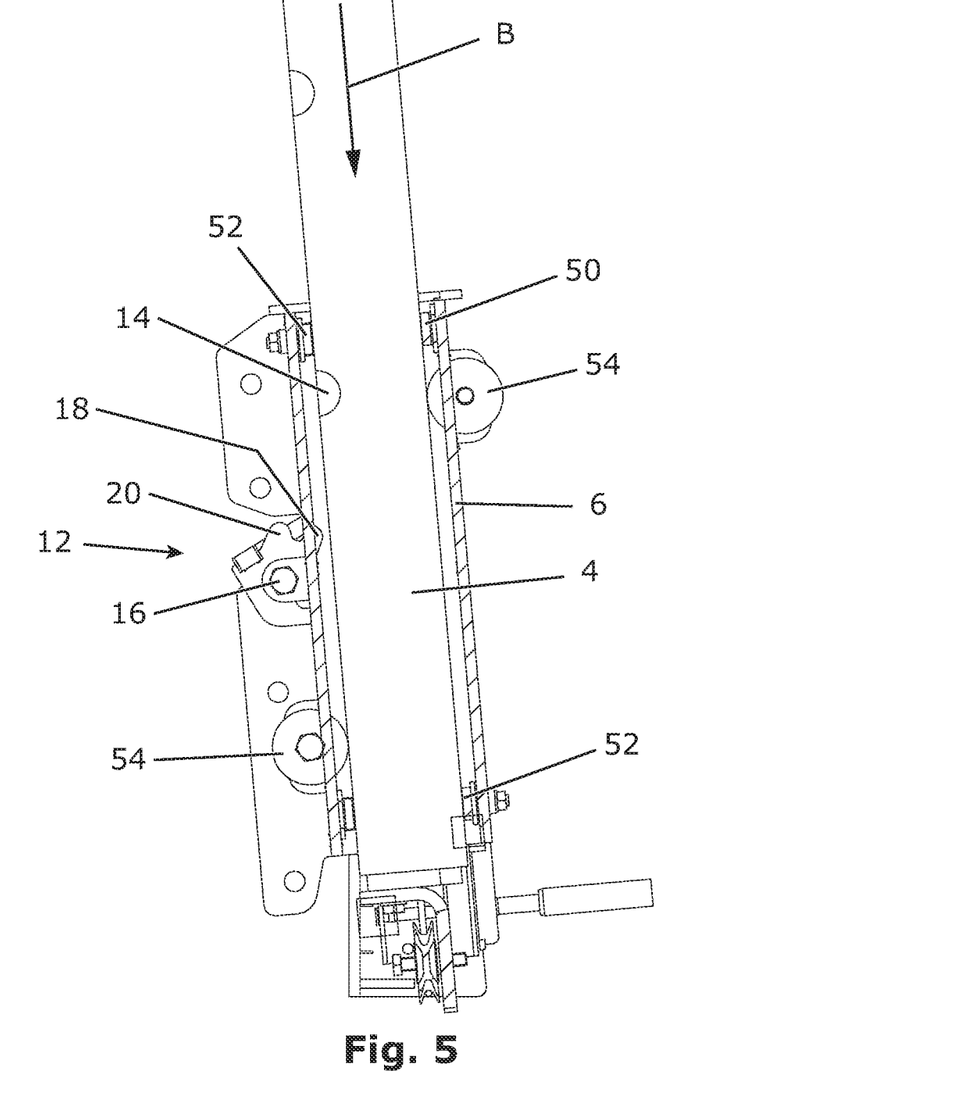

Said retract position is depicted in FIG. 5. For this purpose, the first telescopic element 4 is first moved relative to the second telescopic element 6 in the second direction C again. As a result, as previously described, the first part 18 of the latching element 12 pivots out of the respective recess 14 and the second part 20 of the latching element 12 no longer presses against the outer side 22. If the protective canopy 13 is then to be fully pivoted-in, however, the adjustment element 8 is operated in such a fashion that the latching element 12 remains pivoted in the pivoting direction 40. This may be effected manually or also by means of a motor. The retract position is depicted in FIG. 5. In this case, the first part 18 of the latching element 12, as well as the second part 20 of the latching element 12, are pivoted away from the outer side 22 of the first telescopic element 4. The first telescopic element 4 may then be guided with play in the second telescopic element 6, and the telescopic element 4 may be guided in the first direction B, which leads to the protective canopy 13 being retractable.

Figure 6:
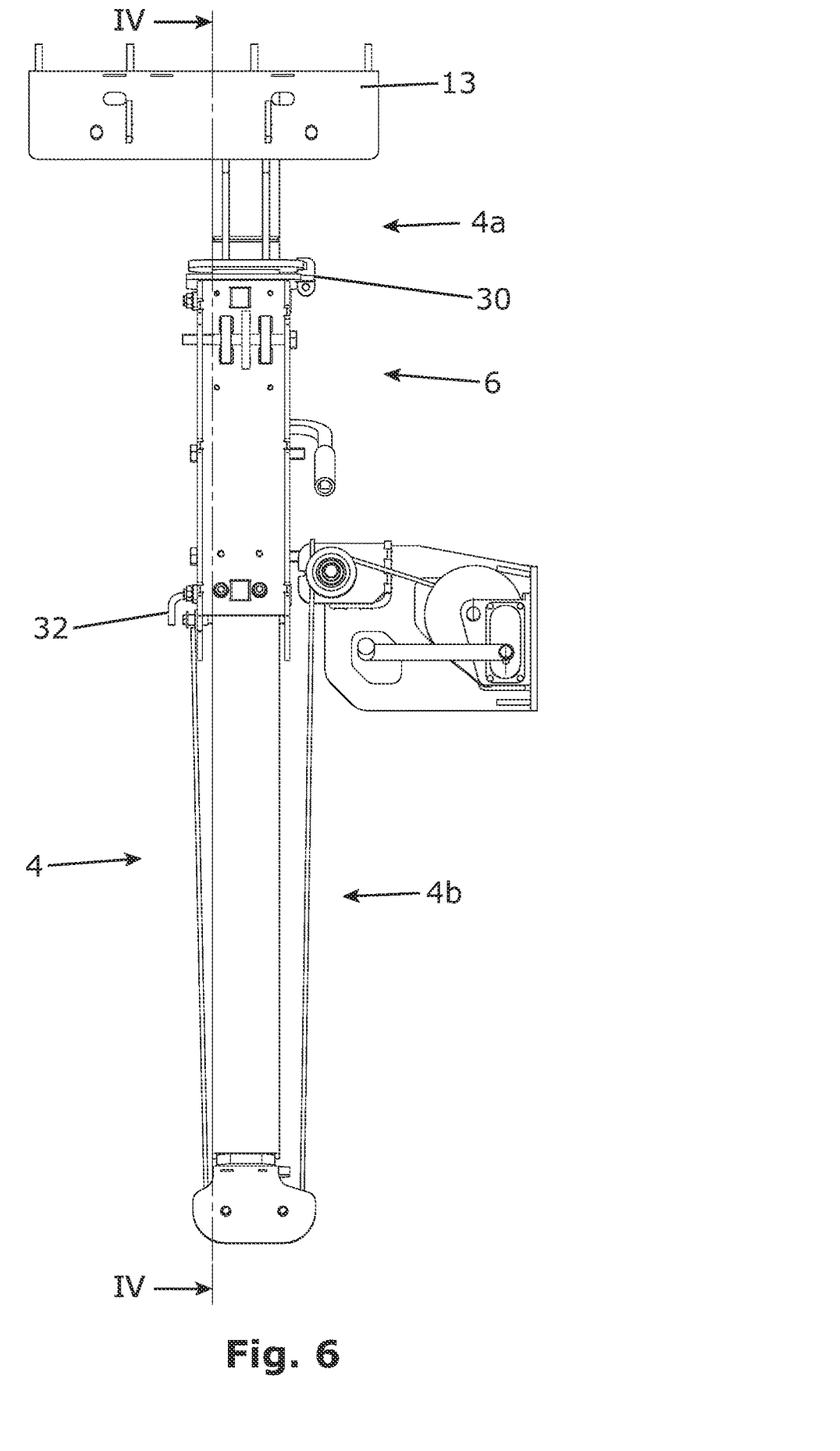

FIG. 6 depicts, for example, the protective canopy 13 or a part of the protective canopy 13 in the retracted position. The part 4a of the first telescopic element 4 is relatively small on the side 30 of the second telescopic element 6, whereas the part 4b of the first telescopic element 4 is relatively large on the second side 32 of the second telescopic element 6.

Figure 7:
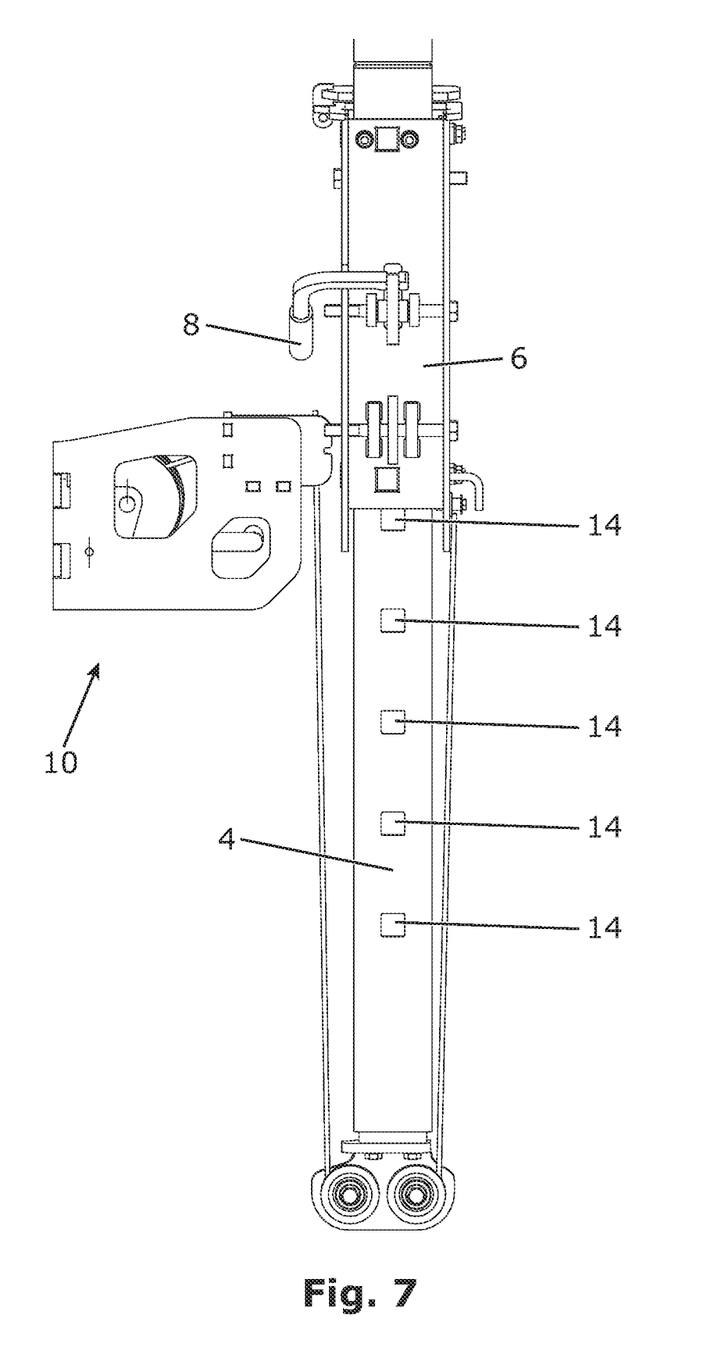

FIG. 7 depicts a different view, from which it can be seen that a plurality of recesses 14 are provided in the first telescopic element 4, into which the first part 18 of the latching element 12 may be pivoted. The protective canopy 13 may thus be locked at a plurality of heights. The contour of the latching element 12, as well as of the first part 18 of the latching element 12 and of the second part 20 of the latching element 12, as well as the position of the pivoting axis 16, is determined by means of tests in each case on specific machines, in which process it must be ensured that the first part 18 of the latching element 12 may pivot into the recess 14 and, in the pivoted-in position, the second part 20 of the latching element 12 may press against the outer side 22 of the first telescopic element 4, and that the first part 18 of the latching element 12 may be pivoted out of the recess 14 when the first telescopic element 4 is moved in the second direction C. Tests are also performed to determine how great the distance between the first part 18 and the second part 20 of the latching element 12 and the pivoting axis 16 must be in order for the second part 20, in the pivoted-in position, to be able to press against the first telescopic element 4 with sufficiently great force, so that vibrations and rattling no longer occur or occur to a reduced degree.

The invention claimed is:

1. A construction machine for working a ground pavement, comprising:
   a machine frame;
   a plurality of wheels or tracks for supporting the machine frame from the ground pavement;
   an operator platform arranged on the machine frame;
   a protective canopy;
   a telescopic guide supporting the canopy at an adjustable height relative to the machine frame, the telescopic guide including:
      a first telescopic element including at least one recess;
      a second telescopic element, the first telescopic element being at least partially guidable in the second telescopic element; and
      a latching element pivotally mounted on the second telescopic element such that the latching element is pivotable about a pivoting axis relative to the second telescopic element, the latching element including a first part and a second part, the latching element being shaped such that when the first telescopic element is moved in a first direction relative to the second telescopic element the first part of the latching element is pivotable into the recess and the second part of the latching element presses against an outer side of the first telescopic element from outside; and a drive configured to move the protective canopy up and down relative to the machine frame by moving the first telescopic element relative to the second telescopic element.

2. The construction machine of claim 1, wherein:
in a latched-in position the first part of the latching element is received in the recess and the second part of the latching element presses against the outer side of the first telescopic element such that the first telescopic element is locked in place in the second telescopic element.

3. The construction machine of claim 1, wherein:
the latching element is pivotable into an adjustment position in which the first part of the latching element is pivoted out of the recess and the second part of the latching element does not press against the outer side of the first telescopic element, so that the first telescopic element is guidable with play in the second telescopic element to adjust the first telescopic element relative to the second telescopic element.

4. The construction machine of claim 3, wherein:
the first part of the latching element includes a contour configured such that beginning in the latched-in position, when the first telescopic element is moved relative to the second telescopic element in a second direction opposite to the first direction, the first part of the latching element pivots out of the recess into the adjustment position.

5. The construction machine of claim 3, wherein:
the latching element is configured such that, beginning in the adjustment position, when the first telescopic element is moved in the first direction relative to the second telescopic element, once the latching element is at a height of the recess the first part of the latching element pivots into the recess.

6. The construction machine of claim 5, wherein:
the latching element is configured such that first part of the latching element pivots into the recess as a result of a self-weight of the latching element.

7. The construction machine of claim 5, wherein:
the latching element includes a spring configured to bias the first part of the latching element into the recess as a result of a spring force.

8. The construction machine of claim 1, further comprising:
an adjustment lever connected to the latching element and configured to pivot the latching element away from the first telescopic element into a retract position such that the first part of the latching element is prevented from pivoting into the recess even during movement of the first telescopic element in the first direction.

9. The construction machine of claim 1, wherein:
in a latched-in position the first part of the latching element is received in the recess and the second part of the latching element presses against the outer side of the first telescopic element such that the first telescopic element is locked in place in the second telescopic element; and
the first direction is in a direction of gravity such that in the latched-in position a total weight force of the first telescopic element and the protective canopy acts on the first part of the latching element and pivots the latching element in a direction such that the second part of the latching element presses against the outer side of the first telescopic element.

10. The construction machine of claim 1, further comprising:
at least one guide element received in the second telescopic element and configured to guide the first telescopic element in the second telescopic element.

11. The construction machine of claim 10, wherein:
the at least one guide element is adjustable to adjust a play with which the first telescopic element is guidable in the second telescopic element.

12. The construction machine of claim 10, wherein:
the at least one guide element includes a sliding guide.

13. The construction machine of claim 10, wherein:
the at least one guide element includes a guide roller.

14. The construction machine of claim 1, wherein:
the protective canopy is offset relative to a longitudinal axis of the first telescopic element.

15. The construction machine of claim 1, wherein:
the first and second telescopic elements are square tubes.

16. A construction machine for working a ground surface, comprising:
a machine frame;
a plurality of wheels or tracks supporting the machine frame from the ground surface;
an operator platform arranged on the machine frame;
a protective canopy; and
an adjustable telescopic guide supporting the canopy at an adjustable height relative to the machine frame, the adjustable telescopic guide including:
a first telescopic tube including a plurality of recesses along a length of the first telescopic tube;
a second telescopic tube, the first telescopic tube being at least partially guidable in the second telescopic tube; and
a latching lever pivotally mounted on the second telescopic element such that the latching lever is pivotable about a pivoting axis relative to the second telescopic tube, the latching lever including a first part and a second part, the latching lever being shaped such that when the first telescopic tube is moved in a first direction relative to the second telescopic tube the first part of the latching lever is pivotable into one of the recesses and the second part of the latching lever presses against an outer surface of the first telescopic tube.

17. The construction machine of claim 16, wherein:
the first telescopic tube extends upward out of the second telescopic tube;
the protective canopy is mounted on the first telescopic tube; and
the second telescopic tube is mounted on the machine frame.

18. The construction machine of claim 16, wherein:
the latching lever is pivotally mounted on the second telescopic tube so that a weight of the latching lever is directed so as to pivot the latching lever downward so that the first part of the latching lever engages one of the recesses when the one of the recesses is aligned with the first part of the latching lever.

19. The construction machine of claim 16, wherein:
in a latched-in position the first part of the latching lever is received in one of the recesses and the second part of the latching lever presses against the outer surface of the first telescopic tube such that the first telescopic tube is locked in place in the second telescopic tube.

20. The construction machine of claim 16, further comprising:
a drive configured to move the protective canopy up and down relative to the machine frame by moving the first telescopic tube relative to the second telescopic tube.

\* \* \* \* \*